(12) United States Patent
Sethi et al.

(10) Patent No.: US 11,670,437 B2
(45) Date of Patent: Jun. 6, 2023

(54) ASSEMBLY AND METHOD FOR SEALING A BUNDLE OF WIRES

(71) Applicant: TE CONNECTIVITY SERVICES GMBH, Schaffhausen (CH)

(72) Inventors: Sunny Sethi, Castro Valley, CA (US); Vijay Daga, Sunnyvale, CA (US); Kavitha Bharadwaj, Fremont, CA (US); Ting Gao, Palo Alto, CA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 0 days.

(21) Appl. No.: 17/574,261

(22) Filed: Jan. 12, 2022

(65) Prior Publication Data

US 2022/0139597 A1    May 5, 2022

Related U.S. Application Data

(63) Continuation of application No. 16/046,577, filed on Jul. 26, 2018, now Pat. No. 11,257,612.

(51) Int. Cl.
| | | |
|---|---|---|
| *H01B 7/285* | (2006.01) | |
| *H02G 15/013* | (2006.01) | |
| *H01B 13/00* | (2006.01) | |
| *H01B 3/30* | (2006.01) | |
| *H01B 3/44* | (2006.01) | |

(52) U.S. Cl.
CPC ......... *H01B 13/0016* (2013.01); *H01B 3/305* (2013.01); *H01B 3/441* (2013.01); *H01B 3/446* (2013.01); *H01B 13/0036* (2013.01); *H01B 7/285* (2013.01); *H01B 13/0013* (2013.01); *H02G 15/013* (2013.01)

(58) Field of Classification Search
CPC .... H01B 13/0016; H01B 3/305; H01B 3/441; H01B 3/446; H01B 13/0036; H01B 7/285; H01B 13/0013; H02G 15/013
USPC .......................................................... 156/85
See application file for complete search history.

(56) References Cited

U.S. PATENT DOCUMENTS

| | | |
|---|---|---|
| 2,932,685 A | 4/1960 | Raila et al. |
| 3,123,663 A | 3/1964 | Muldoon |
| 4,018,733 A | 4/1977 | Lopez et al. |
| 4,181,775 A | 1/1980 | Corke |
| 4,237,609 A | 12/1980 | Clabburn et al. |
| 4,501,927 A | 2/1985 | Sievert |
| 4,693,767 A | 9/1987 | Grzanna et al. |
| 4,865,920 A | 9/1989 | Sweet |

(Continued)

FOREIGN PATENT DOCUMENTS

| | | |
|---|---|---|
| DE | 3940698 C1 | 5/1991 |
| EP | 0158519 A2 | 10/1985 |

(Continued)

*Primary Examiner* — Timothy J Thompson
*Assistant Examiner* — Michael F McAllister

(57) ABSTRACT

A structure for creating a sealed wire bundle includes a first adhesive material in the form of a circular or semi-circular shape. The first adhesive material has a first outer wall with first spoke arms extending inward from the first outer wall. The first adhesive material has a first viscosity. First wire receiving spaces are provided between the first spoke arms. Wires are positioned in the first wire receiving spaces. As heat is applied to the adhesive structure, the adhesive structure flows to fill voids between the plurality of wires to thereby seal the wires.

20 Claims, 16 Drawing Sheets

(56) References Cited

U.S. PATENT DOCUMENTS

| | | | |
|---|---|---|---|
| 4,972,042 A * | 11/1990 | Seabourne | H01B 7/0045 |
| | | | 174/DIG. 8 |
| 4,993,149 A | 2/1991 | Zilligen et al. | |
| 4,997,689 A | 3/1991 | Langen et al. | |
| 5,052,610 A * | 10/1991 | Guerra | H01R 4/723 |
| | | | 228/56.3 |
| 5,140,746 A | 8/1992 | Debbaut | |
| 5,143,761 A | 9/1992 | Chiotis et al. | |
| 5,378,879 A * | 1/1995 | Monovoukas | H05B 6/106 |
| | | | 156/379.7 |
| 5,431,758 A | 7/1995 | Delalle | |
| 5,625,737 A | 4/1997 | Saito | |
| 5,817,983 A | 10/1998 | Rodkey et al. | |
| 5,922,992 A | 7/1999 | Kinney et al. | |
| 6,079,991 A | 6/2000 | Lemke et al. | |
| 6,107,573 A | 8/2000 | Uchiyama et al. | |
| 6,139,336 A | 10/2000 | Olson | |
| 6,302,980 B1 * | 10/2001 | Kortenbach | H01B 13/32 |
| | | | 156/308.2 |
| 6,666,732 B1 | 12/2003 | Endacott | |
| 6,869,292 B2 | 3/2005 | Johnescu et al. | |
| 6,888,067 B1 | 5/2005 | Howland | |
| 7,166,805 B2 | 1/2007 | Robinson et al. | |
| 7,230,214 B2 | 6/2007 | Kirby | |
| 7,364,478 B2 | 4/2008 | Xu | |
| 7,834,268 B2 | 11/2010 | Ootsuki | |
| 7,896,712 B2 | 3/2011 | Cecil et al. | |
| 8,951,063 B2 | 2/2015 | Iio | |
| 9,411,120 B2 | 8/2016 | Crain, Jr. | |
| 9,684,136 B2 | 6/2017 | Cline et al. | |
| 10,263,410 B2 * | 4/2019 | Fukumoto | B32B 27/34 |
| 2007/0128925 A1 | 6/2007 | Graeve et al. | |
| 2011/0177727 A1 | 7/2011 | Zhao | |
| 2016/0013596 A1 | 1/2016 | Regnier | |
| 2017/0200536 A1 * | 7/2017 | Yabe | B32B 7/02 |
| 2018/0010008 A1 | 1/2018 | Lee | |
| 2018/0097344 A1 | 4/2018 | Daga et al. | |
| 2018/0109099 A1 * | 4/2018 | Fukumoto | B32B 27/28 |
| 2018/0226731 A1 | 8/2018 | Sethi et al. | |
| 2018/0226742 A1 | 8/2018 | Sethi et al. | |

FOREIGN PATENT DOCUMENTS

| | | |
|---|---|---|
| EP | 0159945 A2 | 10/1985 |
| EP | 0249510 A1 | 12/1987 |
| EP | 0267028 A2 | 5/1988 |
| EP | 0270283 A2 | 6/1988 |
| EP | 0332821 A2 | 9/1989 |
| EP | 0518032 A1 | 12/1992 |
| FR | 2627026 A1 | 8/1989 |
| WO | 8809068 A1 | 11/1988 |
| WO | 9006977 A1 | 6/1990 |
| WO | 9100896 A1 | 1/1991 |
| WO | 9723924 A1 | 7/1997 |
| WO | 9954962 A1 | 10/1999 |
| WO | 2017053944 A1 | 3/2017 |
| WO | 2018064309 A1 | 4/2018 |

* cited by examiner

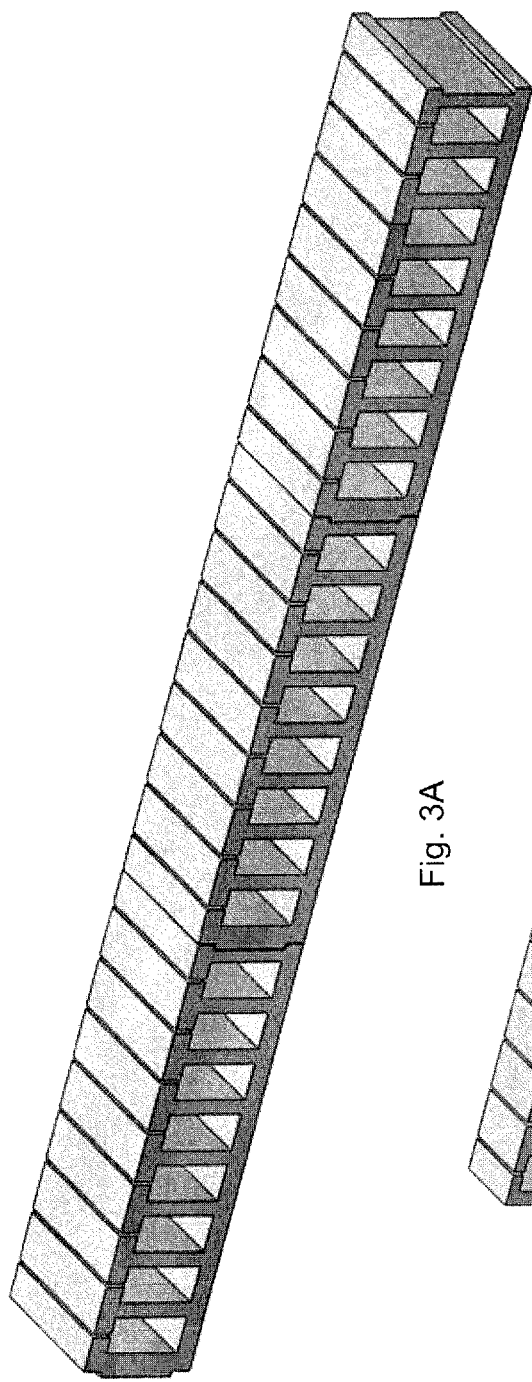
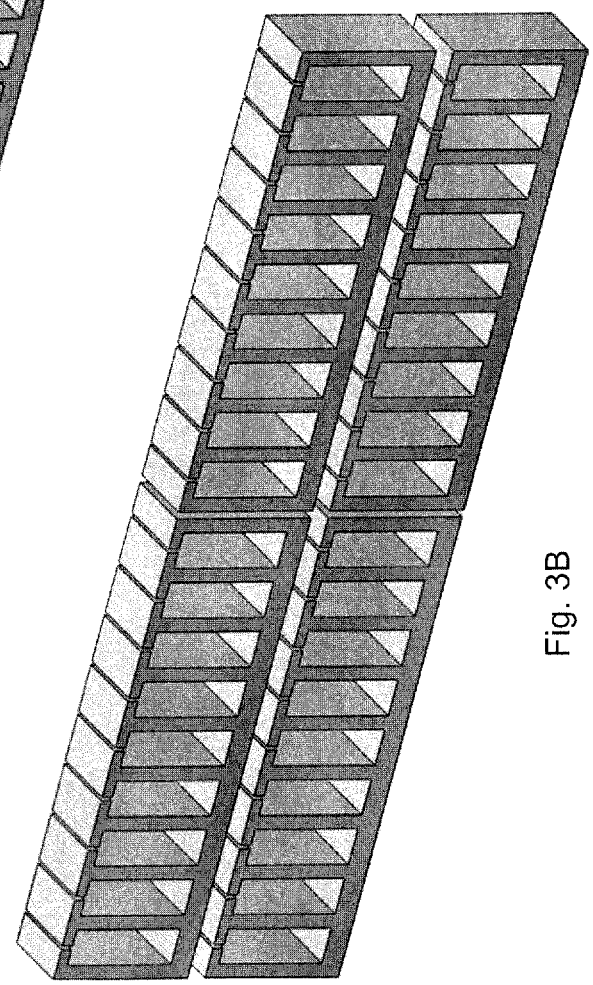
Fig. 3A
Fig. 3B

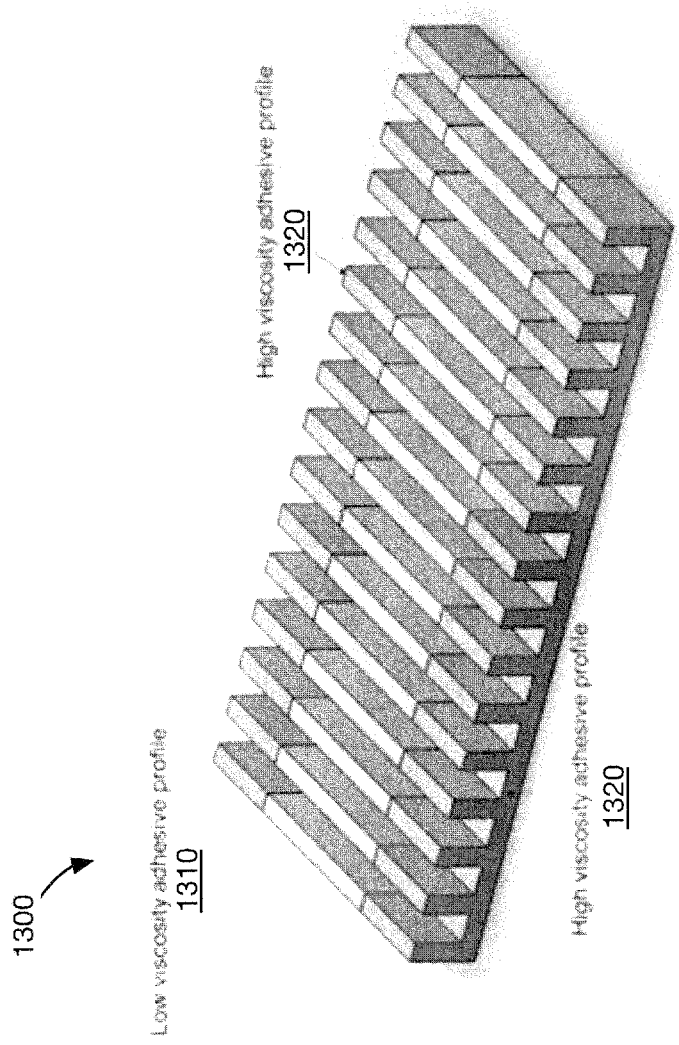

ASSEMBLY AND METHOD FOR SEALING A BUNDLE OF WIRES

CROSS REFERENCE TO RELATED APPLICATIONS

This application claims priority and the benefit of U.S. patent application Ser. No. 16/046,577 filed Jul. 26, 2018 entitled ASSEMBLY AND METHOD FOR SEALING A BUNDLE OF WIRES, which is incorporated by reference herein in its entirety.

BACKGROUND

I. Field

The present invention generally relates to wire assemblies. More specifically, the present invention relates to an assembly and method for sealing a bundle of wires.

II. Description of Related Art

Sealing of wire bundles is typically required in applications where a large number of wires pass through a wall that separates regions having different environmental conditions. For example, in automobiles, power cables, wires/cables from various sensors, controllers and the like may pass from the engine compartment, through an opening in the partition wall, to the passenger compartment. In the region where the wires pass through the opening, the wires may be surrounded by a sealing member. The sealing member maybe configured to completely encapsulate the wires and ideally fill in voids between the wires to prevent moisture/fluids from traveling in between the wires into the cabin. The sealant may also provide sound dampening, thus reducing the noise level in the passenger compartment.

Current methods for sealing wire bundles utilize mastics, RT liquid adhesive systems like silicones and epoxies, and over-molding. Methodologies that utilize mastic work by massaging mastic in between wires/cables. Problems with this approach include high labor costs, poor reliability and poor temperature ratings. In methodologies that utilize RT Liquid curable adhesive systems, the adhesive flows in between the wires and is then cured via stimuli like elevated temperature, moisture or solvent evaporation. However, handling liquid adhesives is challenging in manufacturing, there is a high risk of contamination and curing process requires longer processing time. In methodologies that utilize over-molding, a seal is molded on top of the wires. However, the process needs to be offline and requires expensive equipment and longer processing times.

Other problems with existing sealing members will become apparent in view of the disclosure below.

SUMMARY

In a first aspect, a method for sealing a bundle of wires includes providing an adhesive material having a viscosity of less than about 300 Pa·s at the installation temperature. The method further includes forming a structure from the adhesive and inserting a plurality of wires into the structure. A first amount of heat is applied to the structure in a first heating operation. The first amount of heat being higher than an ambient temperature and lower than a softening/melting temperature of the adhesive structure. Subsequently, a second amount of heat is applied in a second heating operation to the adhesive structure to thereby fully melt the adhesive structure and cause the adhesive of the structure to fill voids between the plurality of wires to thereby seal the wires. Application of the first amount of heat during the first operation to the structure facilitates improved melt uniformity of the structure during the second heating operation.

In a second aspect, a structure for creating a sealed wire bundle includes upper and lower portions that extend in a same longitudinal direction, and a plurality of vertical members that extend between the upper and lower portions. Adjacent vertical members define a space there between for placement of one or more wires. The upper and lower portions and the plurality of vertical members are formed from an adhesive material that has a viscosity of less than about 300 Pa·s and is 40%-95% ethylene-vinyl acetate (EVA) or polyolefin (PO) by weight.

In a third aspect, a structure for creating a sealed wire bundle includes a generally planar strip having a first and a second end section formed of a first adhesive material having a first viscosity and a center section therebetween formed of a second adhesive material having a second viscosity that is less than the first viscosity at a melt temperature. A heat-shrinkable tubing is disposed around the strip such that the first and second end sections of the strip are arranged towards first and second ends of the heat-shrinkable material, respectively. The first viscosity is greater than 1000 Pa·s at the installation temperature and the second viscosity is less than 300 Pa·s at the installation temperature.

In a fourth aspect, a structure for creating a sealed wire bundle includes a first adhesive material in the form of a circular or semi-circular shape. The first adhesive material has a first outer wall. The first adhesive material has a first viscosity. First wire receiving spaces are provided. Wires are positioned in the first wire receiving spaces. As heat is applied to the adhesive structure, the adhesive structure flows to fill voids between the plurality of wires to thereby seal the wires.

BRIEF DESCRIPTION OF THE DRAWINGS

FIG. 3A illustrates a plurality of adhesive structures stacked end-to-end in a longitudinal direction of each adhesive structure;

FIG. 3B illustrates an example of plurality of adhesive structures stacked end-to-end and on top of each other;

FIG. 13 illustrates an exemplary adhesive structure with sections having different viscosity characteristics at a melt temperature;

DETAILED DESCRIPTION

Figure 1B:
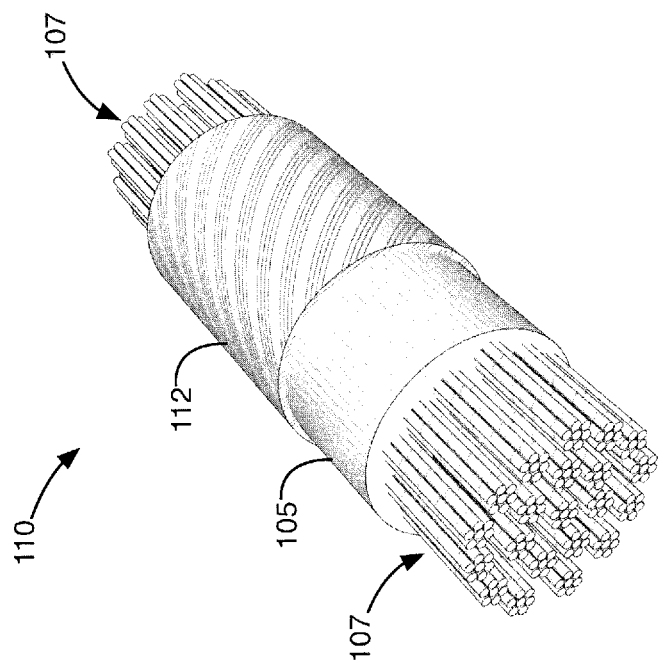
FIGS. 1A and 1B illustrate a sealed wire bundle that includes a plurality of wires encased within an adhesive material.

To overcome the problems discussed above, various structures formed from thermoplastic adhesives and sealant formulations that have desirable sealing and viscosity characteristics are disclosed below.

Generally, the hot melt adhesives and sealants are desirable over mastics and silicones due to their ease of handling, application and high reliability. Hot melt adhesive system may be a thermoplastic or a thermoset. Key challenges in providing a hot melt adhesive-based solution for sealing a large wire bundle include formulating a material that has suitable rheological behavior, controlling adhesive flow direction, providing inward mechanical force and suitable heat delivery system to melt the adhesive. A large wire bundle can be defined as a system including 20 or more wires.

Temperature rating of the sealant material can be based on their rheological behavior. After application, they should not flow out at or below their specification temperature. For example, for a 105° C.-rated product, the material should have little or no flow at temperatures less than or equal to 105° C. Similarly, for 125° C.-rated material, the adhesive should have no or little flow at temperatures less than or equal to 125° C. However, the viscosity of the material should be relatively low at installation temperatures (e.g., between 110° C. and 140° C.) to allow the adhesive to flow in between wires and to displace any trapped air. In general, during installation process, the temperature of the adhesive/sealant may be 10° C. higher than the temperature rating of the structure. So, for example, if the temperature rating were to be about 105° C., during installation process the sealant temperature—temperature is recommended to be >115° C. This is important to ensure a robust seal. For example, in large wire bundle systems that include wires with different diameters, so-called cannon ball geometries are formed between the wires. The voids between the wires can be challenging to fill. Thus, viscosity should be low enough to allow adhesive flow into the voids.

As to adhesive flow direction, fluid flow is determined by the path of least resistance. For a bundle of wires, the path of least resistance is parallel to the wires. However, to form an effective seal, adhesive should flow perpendicular to the wires. Conventional methods that involve use of excess adhesive, like dipping the wires in liquefied adhesive or physically pushing adhesive in between wires, is undesirable for large-volume applications.

As to application of inward mechanical force, as the adhesive liquifies with the application of heat, it is desirable to have a system that prevents dripping of the adhesive system and that provides an inward force to push adhesive in between wires.

To flow in between wires and provide a reliable seal, it is desirable to have adhesive materials with viscosities less than 300 Pa·s. at the installation temperature. The viscosity of the sealant/adhesive materials described herein was measured using a rotation rheometer. In this method, a small disk of sealant material (e.g., 1.5 mm-1.8 mm thick, 25 mm diameter disk) is placed between plates of the rotation rheometer and sheared (oscillatory mode) by means of a rotational motion frequency of 6.28 rad/sec. The temperature of the sealant material is gradually increased from 60° C. to 140° C. at a rate of 5° C./min and 5% strain and the complex viscosity is measured as a function of temperature. For adhesive materials with higher viscosities, adhesives may fail to flow in between so-called cannon ball geometries where three wires sit on top of each other forming a triangle. The space entrapped between the triangle is highly constrained and only low-viscosity fluids may be capable of flowing in between those spaces. The disadvantage of low-viscosity adhesives is that they tend to flow more in directions parallel to the wires than in directions perpendicular to the wires and in between cannon balls.

Figure 1A:
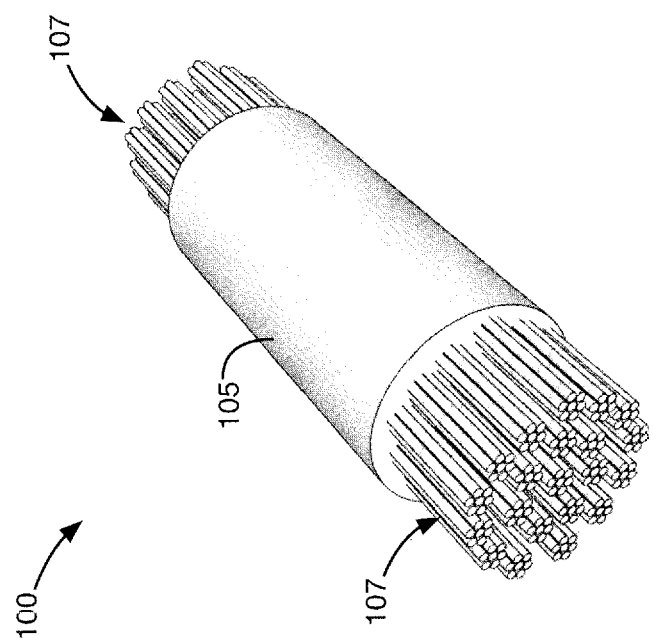

FIGS. 1A and 1B illustrate first and second sealed wire bundle 100, 110 implementations that includes to a plurality of wires 107 encased within an adhesive material 105. The second sealed wire bundle 110 includes a heat-shrinkable material 112 over the adhesive material 105 that, as described in more detail below, improves manufacturability of the sealed wire bundle 110.

The adhesive material 105 may include a thermoplastic polymer and various additives, the combination and relative amounts of which being selected to provide an adhesive with a viscosity of less than about 300 Pa·s. at a softening temperature of >105° C. for a 105° C.-rated application, which may be necessary to ensure adhesive flow between the wires and to provide a reliable seal. Similarly, for a 125° C.-rated application, the combination of thermoplastic polymer and various additives may be selected to provide a softening temperature >125° C. The combination and relative amounts of material in first, second, and third formulations of the adhesive material 105 are shown, respectively, in Tables 1-3 below:

TABLE 1

| Chemical Description | Wt % |
|---|---|
| Polyolefins/Ethylene-vinyl acetate | 40%-95% |
| Waxes/tackifiers | 0-50% |
| IR absorbing pigments (e.g., carbon black) | 0-2% |
| Stabilizers and antioxidants (e.g., sterically hindered phenolic antioxidants) | 0-4% |
| Metal deactivators | 0-2% |

TABLE 2

| Chemical Description | Wt % |
| --- | --- |
| polyamide | 40%-95% |
| Waxes/tackifiers | 0-50% |
| IR absorbing pigments (e.g., carbon black) | 0-2% |
| Stabilizers and antioxidants (e.g., sterically hindered phenolic antioxidants) | 0-4% |
| Metal deactivators | 0-2% |

TABLE 3

| Chemical Description | Wt % |
| --- | --- |
| Polyolefins (e.g., ethylene vinyl acetate) | 71%-90% |
| Viscosity modifiers | 0-10% |
| Organic peroxide | 1-9% |
| Cross-linking promoters (e.g., Trimethallyl isocyanurate (TAIC) or Trimethylolpropane Trimethacrylate (TMPTMA)) | 0-10% |
| IR absorbing pigments (e.g., carbon black) | 0-2% |
| Stabilizers and antioxidants (e.g., sterically hindered phenolic antioxidants) | 0-4% |
| Metal deactivators | 0-2% |

The adhesive material 105 may include a thermoset polymer and various additives, the combination and relative amounts of which being selected to provide an adhesive with a viscosity of less than about 300 Pa·s. before curing which may be necessary to ensure adhesive flow between the wires and to provide a reliable seal. After curing the system, the adhesive material would not flow. An example of a cross-linkable adhesive is shown in the following table:

Various materials may be added to any of the adhesive material 105 implementations described above to improve the sealing characteristics. For example, the adhesive material 105 may include filler materials to improve thermal conductivity without compromising the viscosity characteristics listed above. The filler materials may correspond to carbon (e.g., graphite, graphene, etc.), copper, nickel, aluminum, stainless steel, copper containing alloys, a copper-tin mixture, boron nitride, aluminum nitride, aluminum oxide, silicon carbide, beryllium oxide, silicon nitride, magnesium oxide, and/or other fillers.

Figure 2A:
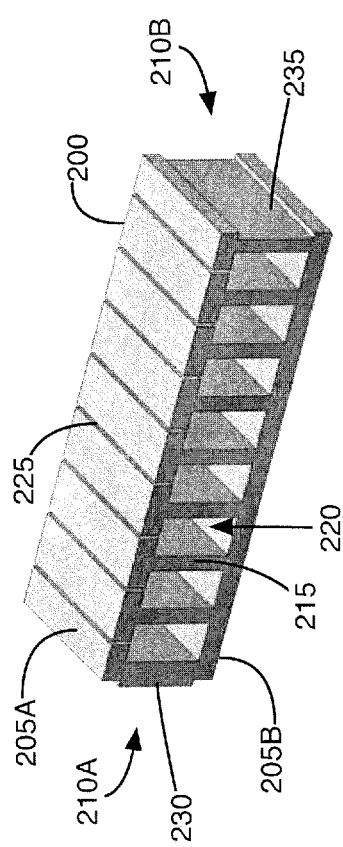
FIGS. 2A and 2B illustrate an exemplary adhesive structure that may be utilized to seal the bundle of wires.
Figure 2B:
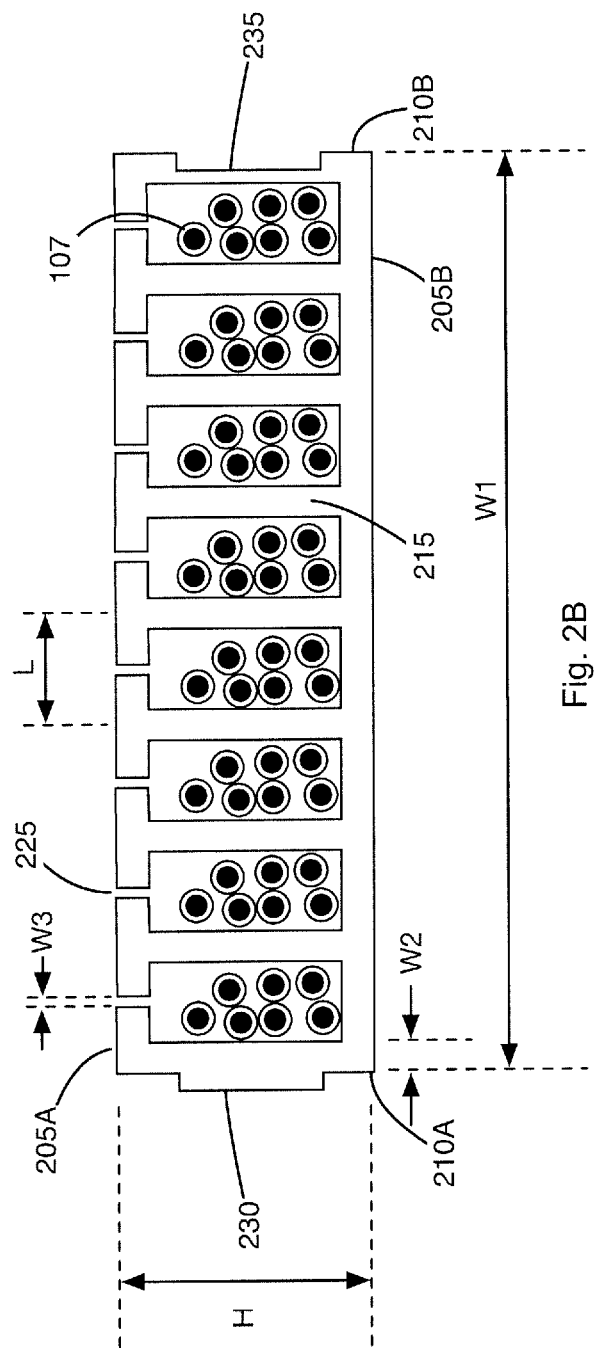

FIGS. 2A and 2B illustrate an exemplary adhesive structure 200 that may be utilized to seal a bundle of wires 107. The adhesive structure 200 may be formed from any of the adhesive material formulations described above via, for example, a molding technique or extrusion technique. In the case of extrusion, the extrudate may be cut to provide individual structures.

As illustrated, the adhesive structure 200 may define a comb-like structure. For example, the adhesive structure 200 may include upper and lower portions 205A, 205B that extend in the same longitudinal direction. A plurality of vertical members 215 may extend between the upper and lower portions 205A, 205B. Adjacent vertical members 215 may define a space there between for placement of one or more wires 107.

In some implementations, the upper and lower portions 205A and 205B may each define generally planar shapes with a width, W1, of about 10-50 mm. A depth of the upper and lower portions 205A, 205B (i.e., the distance into the drawing and not shown) may be about 4-15 mm. The vertical members 215 may have a width, W2, of about 1-5 mm, a height, H, of about 4-12 mm, and may be spaced apart by a distance, L, of about 3-10 mm. The vertical members 215 may be spaced evenly between first and second ends 210A, 210B of the adhesive structure 200 or may be spaced differently. The width of vertical members 210 maybe 1-5 mm. The protrusion 230 maybe 0.5-2 mm and the corresponding cut 235 maybe 0.5-2 mm such that adjacent combs maybe fitted together via 230 and 235.

In yet other implementations, the top portion 205A may define a plurality of gaps 225. Each gap 225 may be disposed above the space 220 defined between adjacent vertical members 215. The gaps 225 may have a width, W3, of about 0.5 mm-2 mm that facilitates insertion of wires 107 through the top portion 205A and into the spaces 220.

In some implementations, a vertical member at a first end 210A of the adhesive structure 205 may define a protrusion 230, and a vertical member at a second end 210B of the adhesive structure 200 that is opposite the first end may define a recess 235 that complements the protrusion 230. The protrusion and recess 230, 235 facilitate stacking a plurality of adhesive structures 200 end-to-end in the longitudinal direction, as illustrated in FIG. 3A. Stacking of a plurality of adhesive structures 200 facilitates sealing a larger bundle of wires than would otherwise be possible with a single adhesive structure 200. In some implementations, the protrusion and recess 230, 235 are configured to lock to one another to prevent separation of the adhesive structures 200 in subsequent manufacturing operations.

As illustrated in FIG. 3B, the adhesive structures 200 may stacked on top of another, side-by-side, or a combination thereof.

Figure 4:
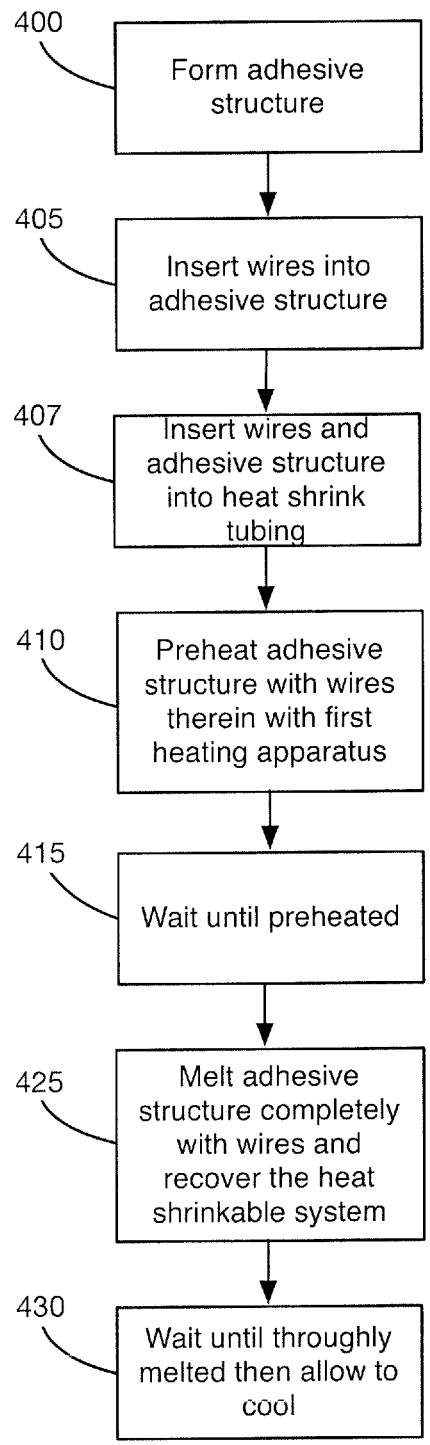
FIG. 4. illustrates exemplary operations for forming the sealed bundle of wires illustrated in FIG. 1 using an adhesive structure and a heat-shrinkable system like a heat-shrink tubing.
Figure 5:
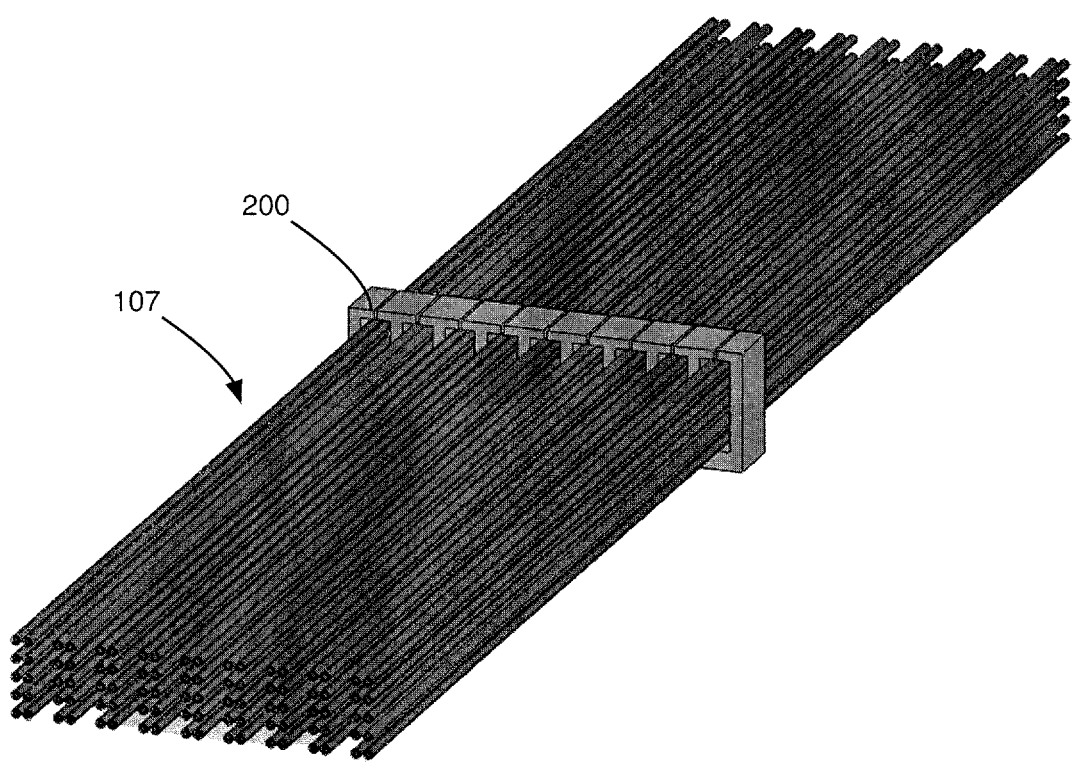
FIG. 5. illustrates a bundle of wires inserted in an adhesive structure.

Exemplary operations for forming the sealed bundle of wires 100 are illustrated in FIG. 4. At operation 400, the adhesive structure 200 of FIGS. 2A and 2B may be provided, and at operation 405 wires 107 may be inserted within the spaces 220 defined between the vertical members 215 of the adhesive structure 200, as illustrated in FIG. 5.

At operation, 407, the adhesive structure 200 and wires may be inserted within, for example, a heat-shrinkable system like a heat shrinkable tubing, heat shrinkable sleeve, a heat shrinkable tape, heat shrinkable grommet or a heat shrinkable boot maybe used as illustrated in FIG. 6. When heated in subsequent operations, the heat-shrinkable system may apply constricting force to the adhesive structure 200 and help ensure that the adhesive material flows into the voids between the wires 107.

The heat-shrinkable system may be formed from materials such as cross-linked polyolefin (e.g., polyethylene copolymer) or fluoropolymer (e.g., ethylene-tetrafluoroethylene copolymer (ETFE) or non-cross-linked materials (e.g., polyethylene terephthalate (PET)) with or without sealants (e.g., sealants in which the polymer-based material is polyamide or a polyethylene copolymer such as ethylene-vinyl acetate copolymer (EVA)). Commercial heat-shrinkable sleeve 605 may be utilized. The material from which the heat-shrinkable sleeve 605 is formed may have a radial shrinkage of 5-80% between 75° C.-325° C.

The wall thickness of the heat-shrinkable material before shrinking may be between about 0.5-2 mm. The heat-shrinkable material may have a shrink ratio of 4:1, 3:1, 2:1, 1.5:1, or a different shrink ratio. The shrink temperature may be between about 100-150° C. For fluoropolymer-based systems like PTFE, shrink temperature can be greater than 325° C.

The heat-shrinkable system maybe a single-walled or a double-walled structure. A double-walled heat-shrinkable structure may include an outer jacket and an inner layer. The inner layer in the double-walled heat-shrinkable structure maybe composed of an adhesive system that can melt and flow on application of heat.

At operation 410, a first heating operation may be performed to preheat the adhesive structure 200 with the wires 107 inserted therein. For example, a first amount of heat may be applied to the adhesive structure 200. The first amount of heat may allow softening or melting adhesive structure without recovering the heat shrinkable system significantly. For example, in an implementation, the adhesive structure 200 with the wires inserted therein may be subjected to a temperature of between about 50° C. and 120° C. for about one minute to raise the temperature of the adhesive structure 200.

Figure 6A:
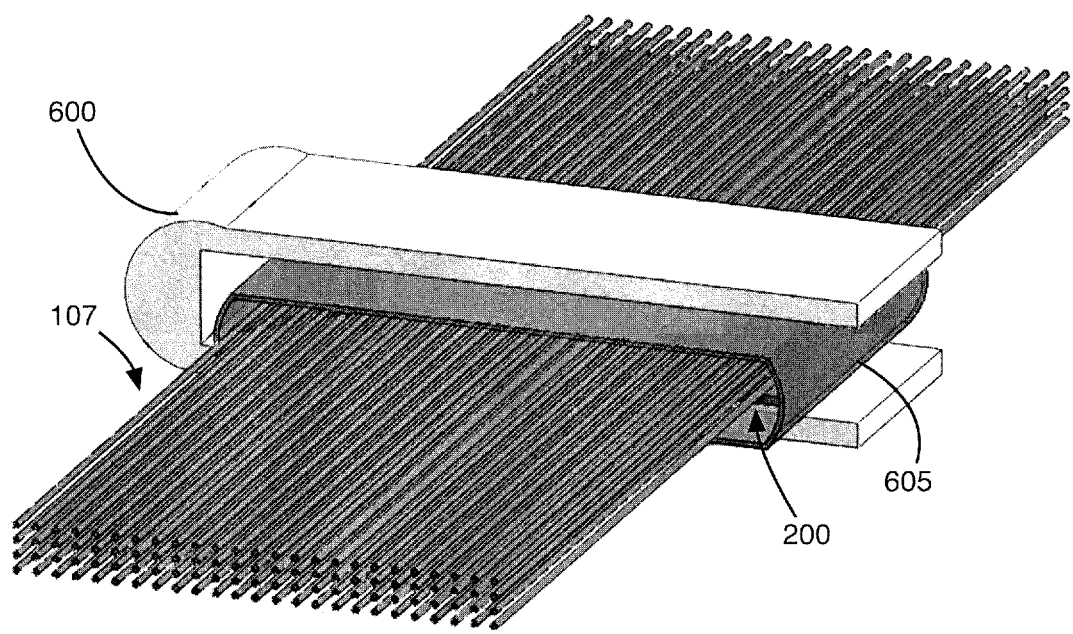
FIGS. 6A and 6B illustrate the bundle of wires and adhesive structure of FIG. 5 inserted within a heat-shrinkable sleeve and illustrate a first exemplary heating apparatus that may be utilized to pre-heat the assembly.
Figure 6B:
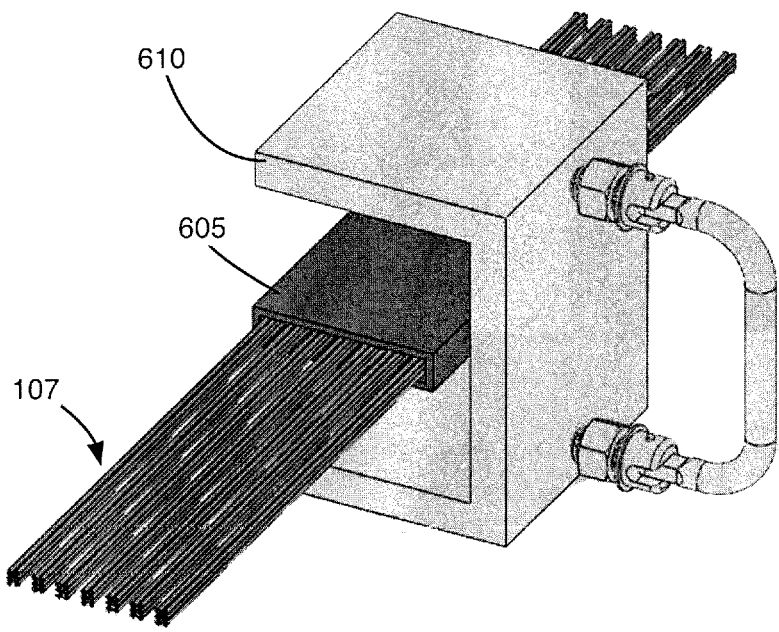

In some implementations, the adhesive structure 200 with the wires 107 inserted therein may be inserted into a heating apparatus specifically configured to heat the adhesive structure 200 such as the exemplary heating apparatus 600 and 610 illustrated in FIG. 6A or 6B. Such specifically configured heating apparatus 600 and 610 may facilitate improved heating uniformity of the adhesive structure 200.

The heating apparatus 600 of FIG. 6A and the heating apparatus 610 of FIG. 6A may apply heat from above and below the heat shrink tubing 605, allowing the adhesive 200 to flow in between wires 107. The pre-heating allows faster application time. The heating apparatus 600 of FIG. 6A may utilize inductive or resistive heating techniques. The heating apparatus 610 of FIG. 6B may utilize IR heating, where the surface of IR heaters of the heating apparatus 610 may be at 300° C. to 700° C.

It should be understood that the heating apparatus may be specifically configured to heat adhesive structures having different configurations.

After waiting a predetermined amount of time at operation 415, at operation 425, a second heating operation may be performed to the adhesive structure 200 and wires 107 to melt the adhesive structure 200. The second heating operation allows fully recovery of the heat shrinkable system and allowing adhesive structure 200 to completely fill the voids in at least one cross-sectional plane. An example of second heating system may include an IR heater with surface temperatures of 300-700° C. Preheating of the structure in the first operation reduces the time needed to uniformly melt the structure in the second operation.

Figure 7:
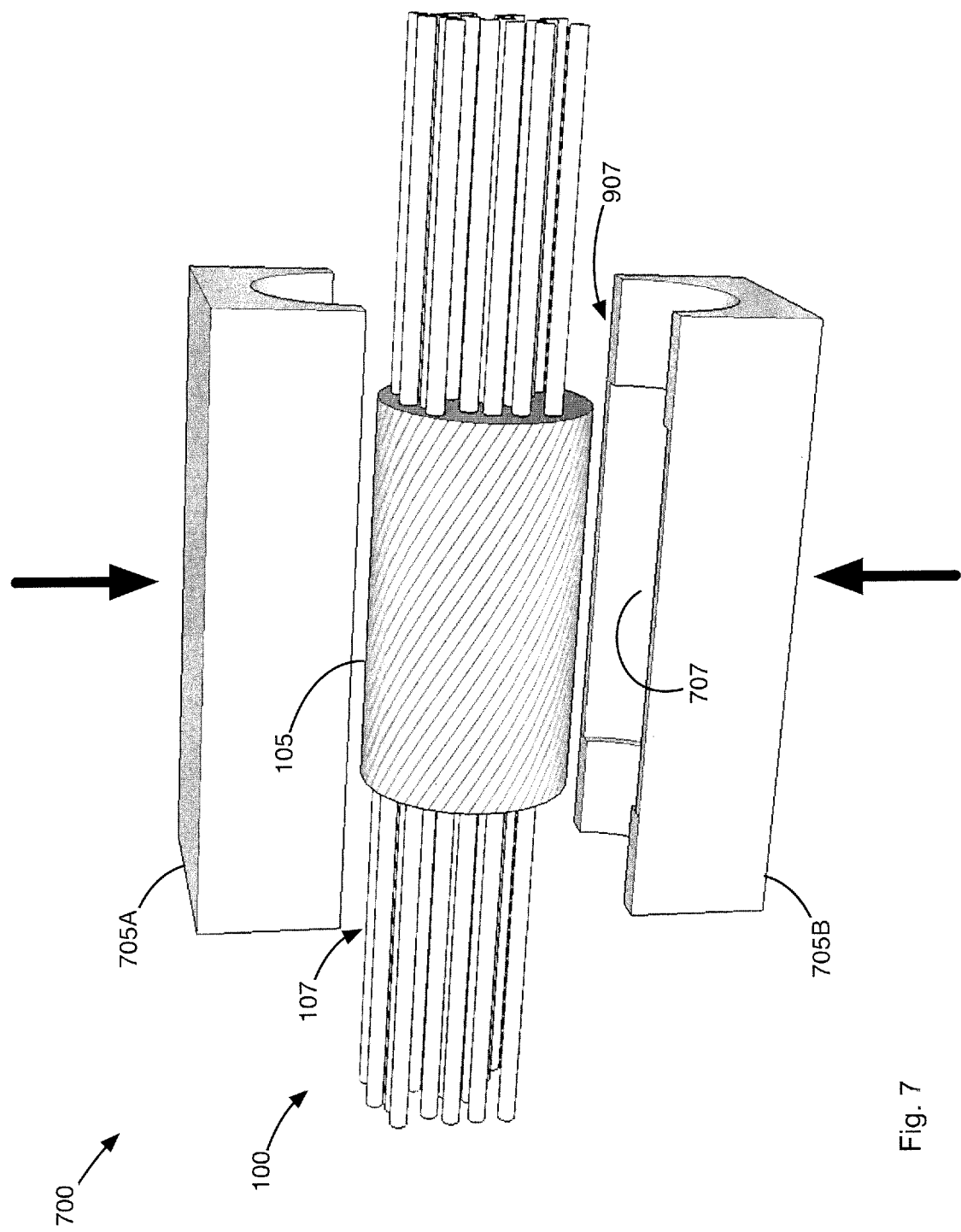
FIG. 7 illustrates a second exemplary heating apparatus that may simultaneously heat and compress the wrapped or rolled preheated adhesive structure.

In some implementations, a heating apparatus such as the heating apparatus 700 of FIG. 7 may be utilized to apply heat to the exposed exterior surface of the structure. For example, the heating apparatus 700 may include a pair of compression plates 705A, 705B that may simultaneously apply pressure to and heat the wrapped adhesive structure 105 with the wires 107 inserted therein. The interior of the region 707 of compression plates 705A, 705B may be configured to form the adhesive into a desired shape such as a cylindrical shape.

Figure 8:
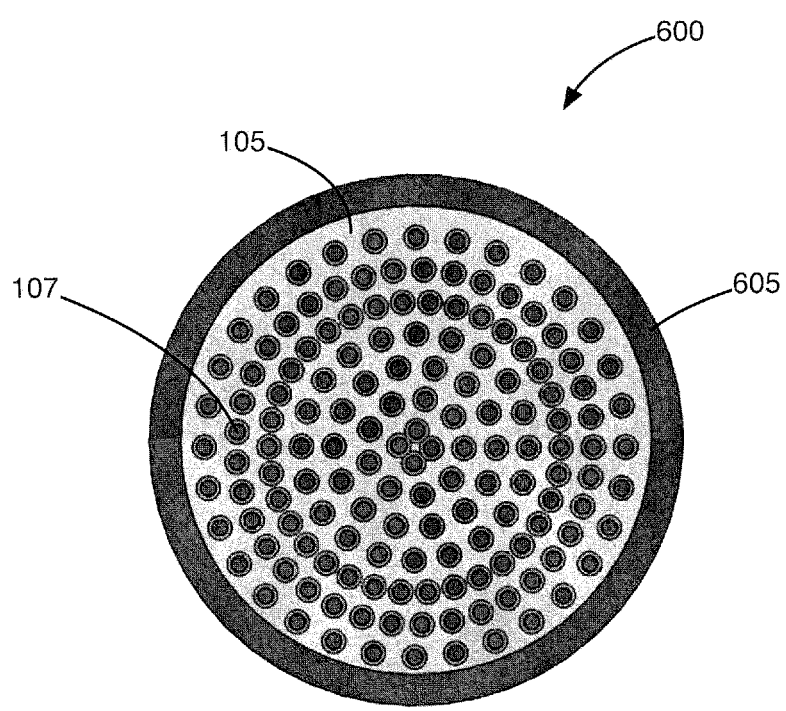
FIG. 8. illustrates a cross-section of sealed wire bundle.

At operation 430, the sealed wire bundle 100 may be allowed to cool before being removed from the second heating apparatus 700. Afterwards, the sealed wire bundle 100 may have the cross-section illustrated in FIG. 8. As shown, the adhesive structure 200 completely melts, and the adhesive material fills any voids between the wires 107. The structure may then be finalized for an intended purpose. For example, the sealed wire bundle 100 may be finalized to facilitate use in an automotive environment where the sealed wire bundle 100 may be snuggly fitted into an opening in the firewall of a vehicle to thereby prevent the ingress of water into the cabin of the vehicle from the engine compartment.

While the assembly and method for sealing a bundle of wires has been described with reference to certain embodiments, it will be understood by those skilled in the art that various changes may be made and equivalents may be substituted without departing from the spirit and scope of the claims of the application.

Figure 9B:
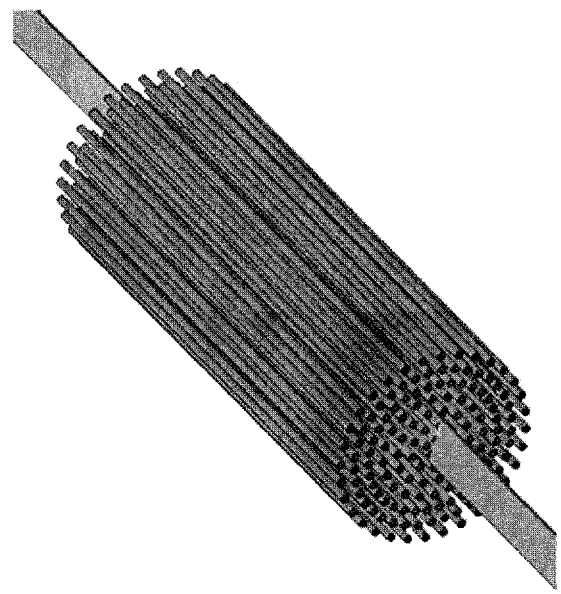
FIGS. 9A and 9B illustrate bundling of a resistive element with the wires into the adhesive structure to facilitate heating a central region of the bundle of an adhesive structure after wrapping.
Figure 9A:
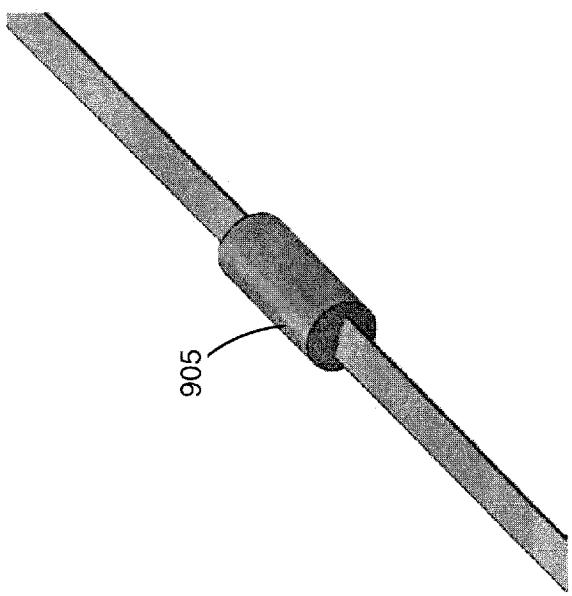

For example, as illustrated in FIGS. 9A and 9B, in addition or as an alternative to preheating the adhesive structure in the first operation, a resistive element 905 may be bundled along with the wires 107 into the adhesive structure 200. Then during the second heating operation, a voltage potential may be placed across electrodes of the resistive element 905 to cause the resistive element 905 to heat to a desired temperature. For example, the combination of resistor and voltage may be selected to generate 200-600 W of power, which may heat the central region to a temperature of about 120° C. in about one to two minutes.

Following application of the voltage, the wrapped bundle with the resistive element 905 therein may be heated in the second heating operation. In this way, the combination of heat applied from the interior of the wrapped adhesive structure 200 and wires 107 and heat applied to the exterior of the adhesive structure 200 and wires 107 via the heating apparatus promotes uniform heating of the wrapped adhesive structure 200 and wires 107 in a reduced amount of time.

Figure 10A:
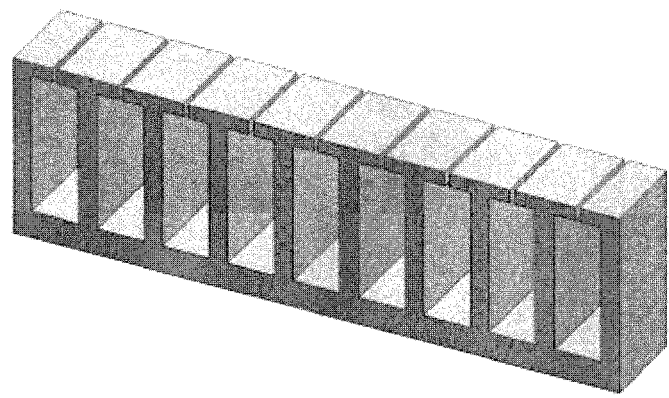
FIGS. 10A-11D illustrate various adhesive structure configuration.
Figure 10B:
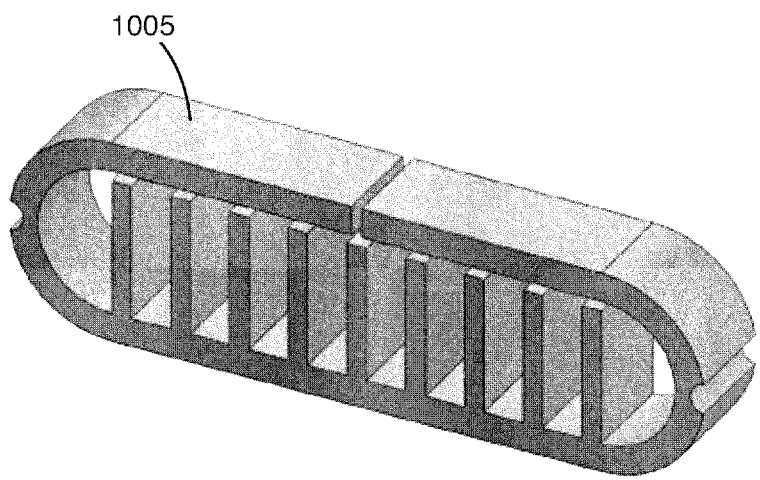

In yet other implementations, the adhesive structure may have a different shape. For example, referring to FIGS. 10A and 10B, the adhesive structure may not have a protrusion of recess (See FIG. 10A), and/or may have a generally oval shape cross-section (See FIG. 10B) with a top portion 1005 configured to flip open to facilitate insertion of wires.

Figure 11A:
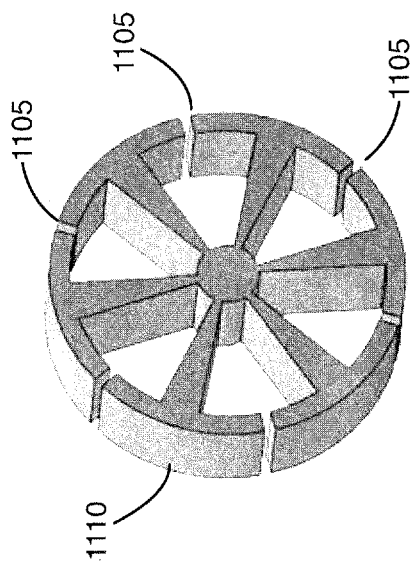
Figure 11C:
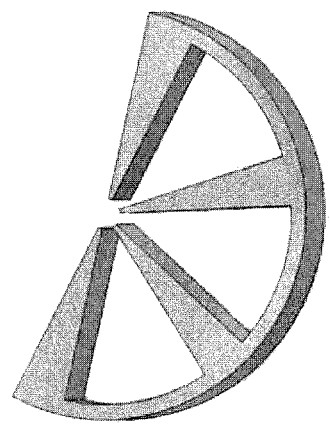
Figure 11B:
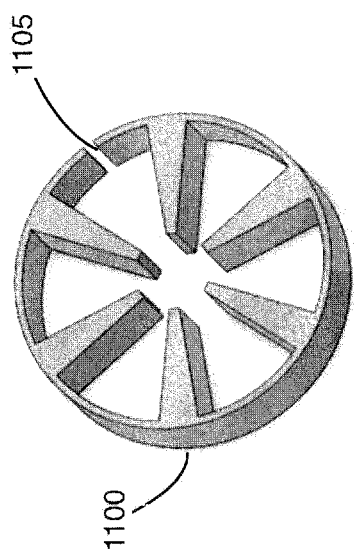
Figure 11D:
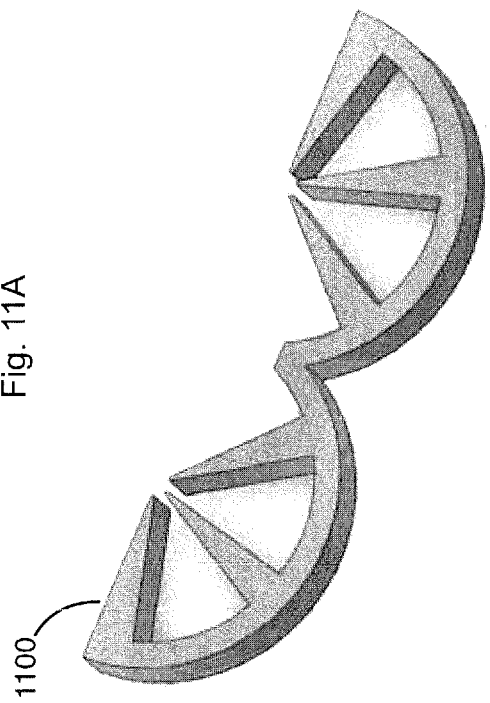

As illustrated in FIGS. 11A-11D, the adhesive structure may have a general circular or semi-circular shape. The circular-shaped structure 1100 of FIG. 11A may include a gap 1105 that facilitates opening the structure 1100, as also illustrated in FIG. 11B, to facilitate placement of wires. The circular-shaped structure 1110 of FIG. 11C may have a hub-and-spoke configuration with gaps 1105 around the perimeter to facilitate placement of wires within the structure 1110.

Figure 12B:
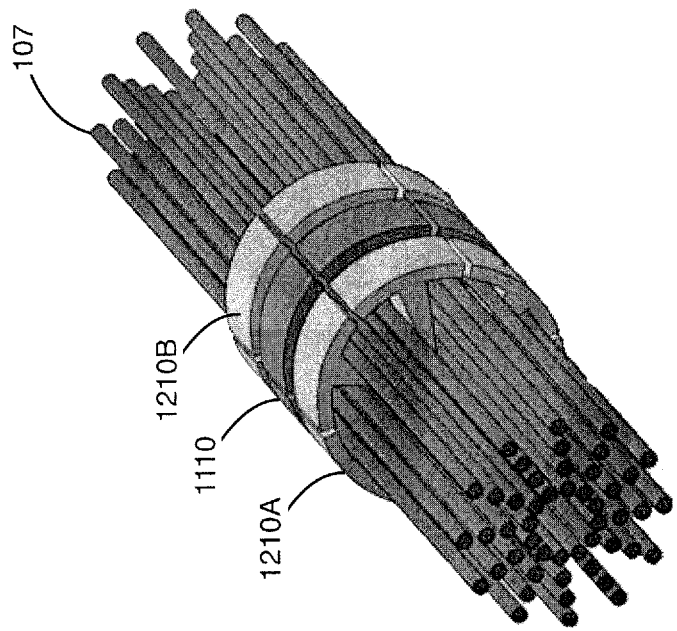
FIGS. 12A and 12B illustrate different exemplary configurations of the sealing assembly.
Figure 12A:
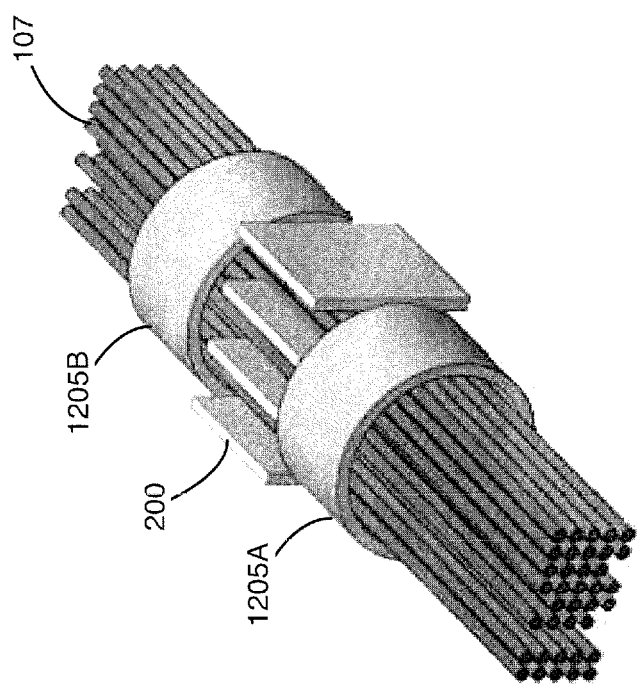

Other operations may be performed to improve manufacturability of the sealed wire bundle 100. For example, as illustrated in FIGS. 12A and 12B, the wires 107 may be placed within a first adhesive structure 200, 1110 formed from one of the materials described above. Second and third adhesive structures 1205A, 1205B, 1210A, 1210B formed from materials having a higher viscosity than the first adhesive structure 200, 1110 may be placed on opposite ends of the first adhesive structure 200, 1110, as illustrated. The second and third adhesive structures 1205A, 1205B, 1210A, 1210B may be the same or different materials.

The second and third adhesive structures 1205A, 1205B, 1210A, 1210B may have a thickness between about 0.5-2 mm and may be formed from adhesive material that has a higher viscosity than the low-adhesive material(s) described above. The high-viscosity adhesive material be characterized by the following parameters:

| | |
|---|---|
| Viscosity (V) | >500 Pa s (preferably >1000 Pa s) at ≥110° C. for a 105° C. rated system |

The adhesive chemistry for high-viscosity adhesive may be similar to low-viscosity adhesive and the higher viscosity may be attained by, for example, using a higher molecular weight polymer and/or by adding fillers such as silica fillers. Other manners known to the skilled artisan may be utilized.

The second and third adhesive structures 1205A, 1205B, 1210A, 1210B may include filler and stabilizer materials to improve thermal conductivity without compromising the viscosity characteristics listed above and to improve long-time temperature aging characteristics, respectively.

All three structures 200, 1110, 1205A, 1205B, 1210A, 1210B may be preheated to raise the respective temperatures of the adhesive structures 200, 1110, 1205A, 1205B, 1210A, 1210B close to a melting point. Then during the second heating operation, the adhesive structures 200, 1110, 1205A, 1205B, 1210A, 1210B may be melted to seal the wires. The second and third adhesives structures 1205A, 1205B, 1210A, 1210B with the higher viscosity may help prevent the first adhesive structure 200, 1110, with the lower viscosity from seeping out through the wire bundle when melted.

Figure 14A:
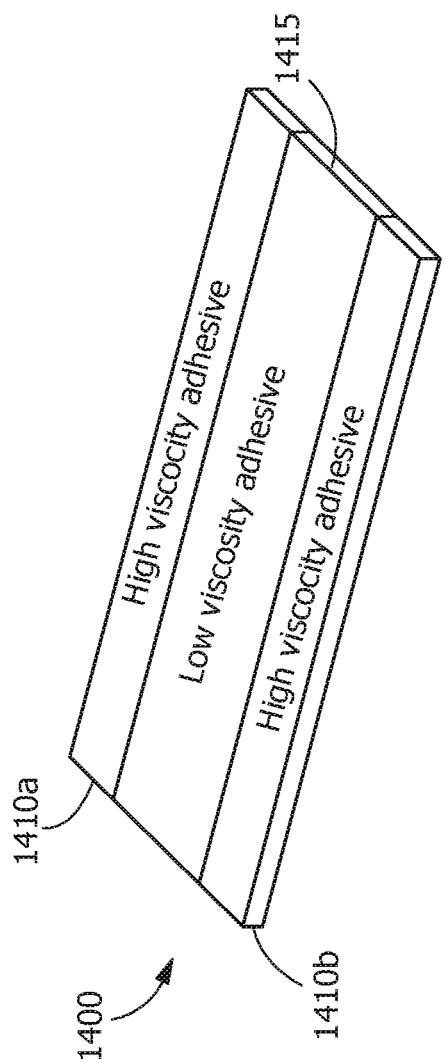
FIG. 14A illustrates a multi-viscosity adhesive strip.
Figure 14B:
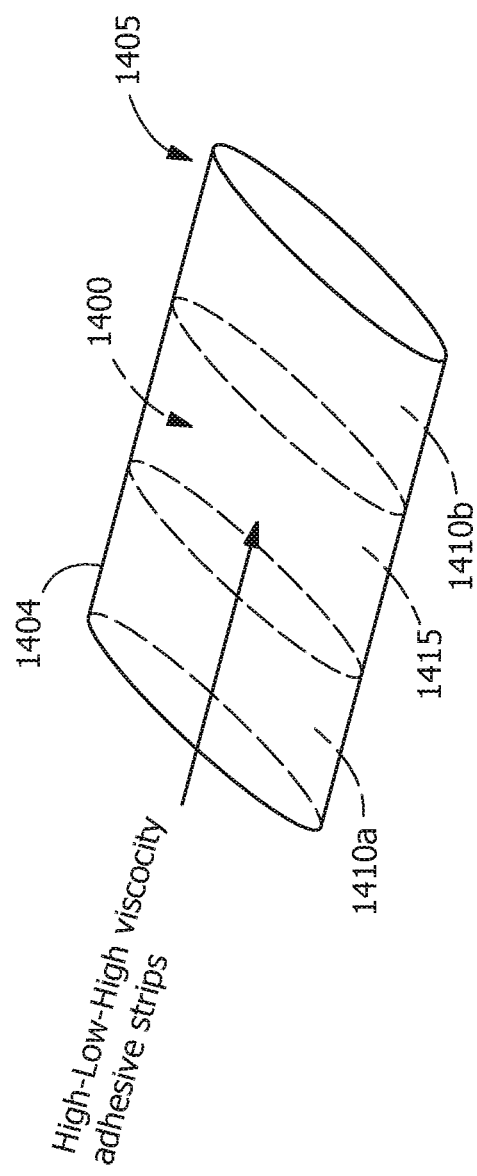
FIG. 14B illustrates an exemplary assembly that includes a strip of shaped adhesive structure embedded within a heat-shrinkable tubing.

Other implementations that utilize a combination of low- and high-viscosity adhesive materials in the implementation of the adhesive structure are illustrated in FIGS. 13, 14A, and 14B.

As illustrated in FIG. 13, the comb-like structure 1300 described above may be formed from both low- and high-viscosity materials 1310, 1320, as illustrated.

FIG. 14A illustrates a multi-viscosity adhesive strip where edges have high-viscosity adhesive and center has low-viscosity adhesive. The high-viscosity adhesive acts as a barrier for low-viscosity adhesives to prevent flow parallel to the wires. As shown, a high-low-high viscosity adhesive strip maybe placed on the wire bundles. Subsequently a heat shrink tubing maybe inserted on top of the adhesive strips.

Alternatively, as shown in FIG. 14B, an adhesive strip 1400 may be pre-installed within the heat-shrink tubing sleeve 1404 such that the strip 1400 generally follows the interior surface of the heat-shrinkable sleeve, as illustrated. Upon heating, the heat-shrinkable sleeve 1405 compresses the adhesive strip 1400 as it melts. The high-viscosity material sections 1410a and b of the strip help to maintain the bulk of the low-viscosity material section 1415 within the heat-shrinkable sleeve 1404 during shrinkage.

In some implementations, the adhesive strip 1400 may be arranged on one side of the interior surface of the heat-shrinkable sleeve 1404. In other implementations, the adhesive strip 1400 may wrap around most or all of the interior surface of the heat-shrinkable sleeve 1404. In yet other implementations, a second adhesive strip may be arranged within the heat-shrinkable sleeve 1404 on a side opposite the first adhesive strip 1400.

In yet other embodiments, a heat shrinkable system may be utilized to form a sealed bundle of wires. The heat shrinkable system may have an outer heat shrinkable formed from any heat shrinkable material described above, and an inner adhesive layer formed from any adhesive material described above. The operations for forming a sealed bundle of wires are set out in steps 1500-1520 in FIG. 15, which are similar to corresponding operations described above in FIG. 4.

Figure 15:
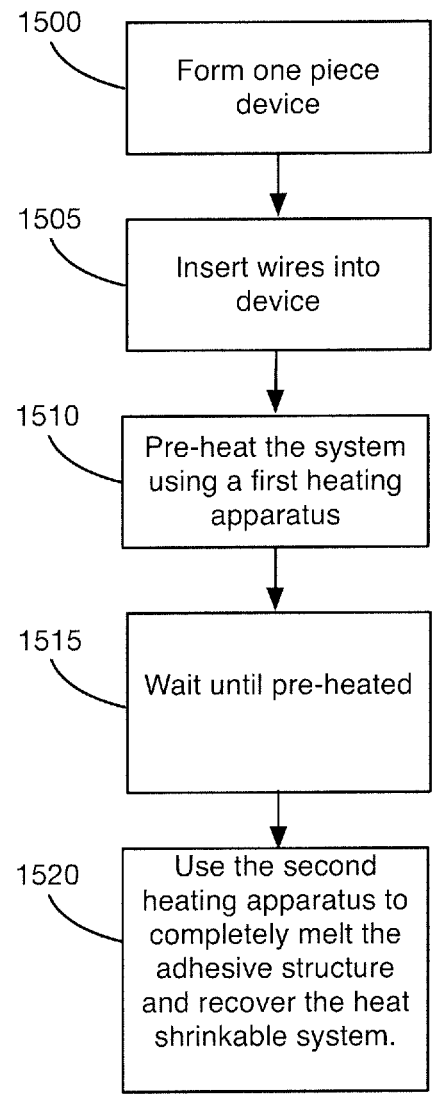
FIG. 15 Illustrates exemplary operations for forming the sealed bundle of wires using a one piece device that has adhesive profile pre-installed inside a heat-shrinkable system such as heat-shrink tubing.
Figure 16B:
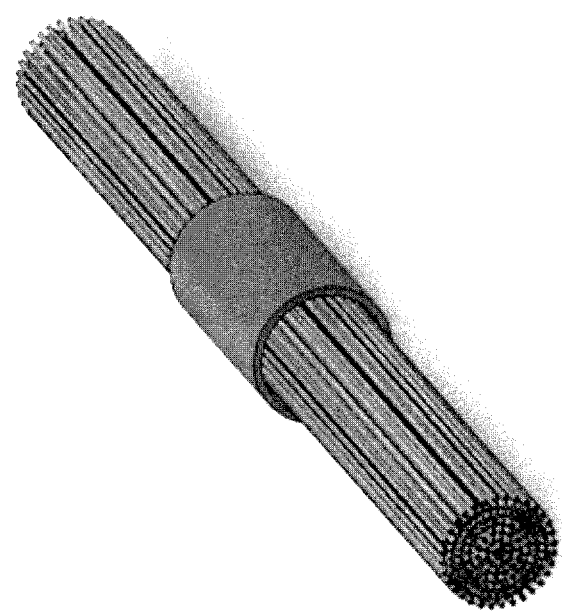
FIGS. 16A and 16B illustrates a wire bundle inserted into the heat shrinkable system before and after application of heat, respectively.
Figure 16A:
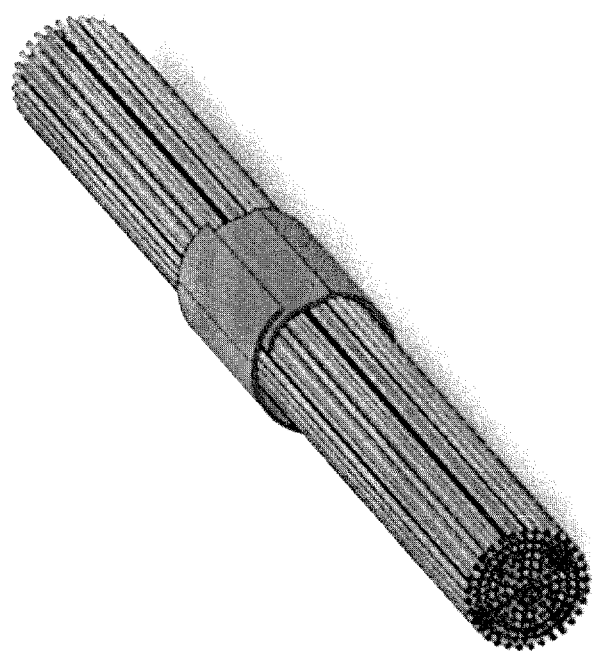

FIGS. 16A and 16B illustrates a wire bundle inserted into the heat shrinkable system before and after application of heat, respectively, after application of the operations of FIG. 15.

Other modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

We claim:

1. A structure for creating a sealed wire bundle comprising:
   a first adhesive material in the form of a circular or semi-circular shape, the first adhesive material having a first outer wall, the first adhesive material having a first viscosity;
   first wire receiving spaces;
   first spoke arms extend inward from the first outer wall, the first wire receiving spaces are provided between the first spoke arms;
   wherein wires are positioned in the first wire receiving spaces;
   wherein as heat is applied to the structure, the first adhesive material flows to fill voids between the plurality of wires to thereby seal the wires.

2. The structure as recited in claim 1, wherein the first adhesive material has a viscosity of less than about 300 Pa·s.

3. The structure as recited in claim 2, wherein the first adhesive material is approximately 40% to approximately 95% ethylene-vinyl acetate or polyolefin or polyamide by weight.

4. The structure as recited in claim 2, wherein the first adhesive material includes filler material and stabilizer material to improve thermal conductivity without compromising viscosity.

5. A structure for creating a sealed wire bundle comprising:
   a first adhesive material in the form of a circular or semi-circular shape, the first adhesive material having a first outer wall, the first adhesive material having a first viscosity;
   first wire receiving spaces;
   the first outer wall includes at least one gap;
   wherein wires are positioned in the first wire receiving spaces;
   wherein the at least one gap facilitates insertion of wires through the first outer wall and into the first wire receiving spaces;
   wherein as heat is applied to the structure, the first adhesive material flows to fill voids between the plurality of wires to thereby seal the wires.

6. The structure as recited in claim 5, wherein the at least one gap is a plurality of gaps, with each gap of the plurality of gaps being disposed in line with each first wire receiving space of the first wire receiving spaces.

7. The structure as recited in claim 1, wherein the first spoke arms have first ends which extend from the first outer wall and second ends which are spaced from the first outer wall, the first ends having a larger cross-sectional area than the second ends.

8. The structure as recited in claim 1, wherein a second adhesive material in the form of a circular or semi-circular shape is positioned on a first side of the first adhesive material, the second adhesive material having a second viscosity.

9. The structure as recited in claim 8, wherein:
   the second adhesive material has a second outer wall with second spoke arms extending inward from the second outer wall;
   second wire receiving spaces are provided between the second spoke arms;
   wherein the wires are positioned in the second wire receiving spaces.

10. The structure as recited in claim 8, wherein the viscosity of the second adhesive material is higher than the viscosity of the first adhesive material.

11. A structure for creating a sealed wire bundle comprising:
- a first adhesive material in the form of a circular or semi-circular shape, the first adhesive material having a first outer wall, the first adhesive material having a first viscosity;
- a second adhesive material in the form of a circular or semi-circular shape, the second adhesive positioned on a first side of the first adhesive material, the second adhesive material having a second viscosity;
- a third adhesive material in the form of a circular or semi-circular shape, the third adhesive positioned on a second side of the first adhesive material, the third adhesive material having a third viscosity;
- first wire receiving spaces;
- wherein wires are positioned in the first wire receiving spaces;
- wherein as heat is applied to the structure, the first adhesive material flows to fill voids between the plurality of wires to thereby seal the wires.

12. The structure as recited in claim 11, wherein:
- the third adhesive material has a third outer wall with third spoke arms extending inward from the third outer wall;
- third wire receiving spaces are provided between the third spoke arms;
- wherein the wires are positioned in the third wire receiving spaces.

13. The structure as recited in claim 11, wherein the viscosity of the third adhesive material is higher than the viscosity of the first adhesive material.

14. The structure as recited in claim 13, wherein the viscosity of the second adhesive material is approximately equal to the viscosity of the third adhesive material.

15. The structure as recited in claim 11, wherein the thickness of the first adhesive material, the second adhesive material and the third adhesive material is between approximately 0.5 mm and 2.0 mm.

16. The structure as recited in claim 11, wherein the second adhesive material and the third adhesive material include filler material and stabilizer material to improve thermal conductivity without compromising viscosity.

17. The structure as recited in claim 7, wherein the first adhesive has a first center hub which is spaced from the first outer wall, the second ends of the first spoke arms extend to the first center hub.

18. The structure as recited in claim 17, wherein the first outer wall has a plurality of gaps which facilitate insertion of wires through the first outer wall and into respective first wire receiving spaces of the first wire receiving spaces.

19. The structure as recited in claim 11, wherein:
- the first adhesive has a first center hub which is spaced from the first outer wall, first spoke arms of the first adhesive extend from the first outer wall to the first center hub;
- the second adhesive has a second center hub which is spaced from the second outer wall, second spoke arms of the second adhesive extend from the second outer wall to the second center hub; and
- the third adhesive has a third center hub which is spaced from the third outer wall, third spoke arms of the third adhesive extend from the third outer wall to the third center hub.

20. The structure as recited in claim 11, wherein the first adhesive, the second adhesive and the third adhesive have a heat-shrinkable material which extends over the first outer wall, the second outer wall and the third outer wall.

* * * * *